United States Patent
Park

(10) Patent No.: US 7,474,679 B2
(45) Date of Patent: Jan. 6, 2009

(54) LASER APPARATUS AND MANUFACTURING METHOD OF THIN FILM TRANSISTOR USING THE SAME

(75) Inventor: Cheol-Ho Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 142 days.

(21) Appl. No.: 11/334,028

(22) Filed: Jan. 18, 2006

(65) Prior Publication Data

US 2006/0176920 A1    Aug. 10, 2006

(30) Foreign Application Priority Data

Feb. 7, 2005   (KR)  ............ 10-2005-0011255

(51) Int. Cl.
*H01S 3/13* (2006.01)
*H01S 3/08* (2006.01)
(52) U.S. Cl. ............... 372/29.014; 372/103
(58) Field of Classification Search ........ 372/9, 372/24, 103, 25, 29.014, 31

See application file for complete search history.

(56) References Cited

U.S. PATENT DOCUMENTS

| | | | | |
|---|---|---|---|---|
| 5,973,785 | A | * 10/1999 | Okamoto | ........... 356/521 |
| 2002/0025591 | A1 | * 2/2002 | Ohnuma et al. | ........... 438/30 |
| 2003/0022071 | A1 | * 1/2003 | Sugita et al. | ........... 430/5 |
| 2004/0089900 | A1 | * 5/2004 | Ishikawa et al. | ........... 257/347 |

FOREIGN PATENT DOCUMENTS

| | | | |
|---|---|---|---|
| JP | 10-223554 | * | 8/1998 |
| JP | 2000-306859 | | 11/2000 |
| JP | 2003-218056 | | 7/2003 |
| KR | 2000-0001215 | | 1/2000 |
| KR | 2004-025861 | | 3/2004 |

* cited by examiner

*Primary Examiner*—Armando Rodriguez
(74) *Attorney, Agent, or Firm*—F. Chau & Associates, LLC

(57) ABSTRACT

A laser apparatus comprises a laser generating unit, and an intensity pattern regulating unit including a pair of blocking parts and a pair of semi-through parts, wherein the pair of semi-through parts are placed between the pair of blocking parts and adjust an intensity of an incident laser beam.

11 Claims, 13 Drawing Sheets

LASER APPARATUS AND MANUFACTURING METHOD OF THIN FILM TRANSISTOR USING THE SAME

CROSS-REFERENCE TO RELATED APPLICATION

This application claims priority to Korean Patent Application No. 2005-0011255, filed on Feb. 7, 2005, the disclosure of which is incorporated herein by reference in its entirety.

BACKGROUND OF THE INVENTION

1. Technical Field

The present disclosure relates to a laser apparatus and a manufacturing method of a thin film transistor using the same, and more particularly to a laser apparatus used to make an amorphous silicon layer uniform during a crystallization process and a manufacturing method of a thin film transistor substrate using the same.

2. Discussion of the Related Art

A flat panel display device is widely used for a display device. The flat panel display device comprises, for example, a liquid crystal display or an organic light emitting diode display.

The liquid crystal display and the organic light emitting diode display show images by different mechanisms, but both include thin film transistors.

The thin film transistor comprises, for example, a channel area, a gate electrode, a source electrode, and a drain electrode. The channel area may be formed by amorphous silicon. The amorphous silicon has low electrical properties and reliability due to its low mobility.

A polysilicon thin film transistor of which the channel area is formed by polysilicon having mobility of about 20 $cm^3$/Vsec to about 150 $cm^3$/Vsec has been developed. Since the polysilicon thin film transistor has higher mobility than a thin film transistor comprising the channel area formed by an amorphous silicon, chip in glass, which means forming a driving circuit within a substrate, can be performed without difficulty by the polysilicon thin film transistor.

Processes for forming polysilicon layers include an evaporating process evaporating the polysilicon on the substrate at high temperature, a high temperature crystallization process depositing the amorphous silicon and crystallizing the amorphous silicon at about 600° C., and a heat treating process depositing the amorphous silicon and treating by laser.

A conventional process using the laser comprises a sequential lateral solidification (SLS) method and an excimer laser annealing (ELA) method. In the SLS method, grains of the polysilicon grow parallel with the substrate. In the ELA method, grains of the polysilicon grow perpendicular to the substrate.

The ELA process crystallizes the amorphous silicon by scanning the amorphous silicon layer with a strip-shaped laser beam. While the size of the substrate becomes larger, the length of the laser beam is limited. Accordingly, a double scan method scanning the laser beam twice to one substrate has been employed. However, the double scan method generates an overlapping region where the laser beam is overly irradiated, thereby causing the polysilicon layer to be inhomogeneous.

SUMMARY OF THE INVENTION

Embodiments of the present invention provide a laser apparatus used to make an amorphous silicon layer uniform during a crystallization process by a multiple scan and a manufacturing method of a thin film transistor (TFT) substrate using the same.

According to an embodiment of the present invention, a laser apparatus comprises a laser generating unit, and an intensity pattern regulating unit having a pair of blocking parts disposed parallel with each other and a pair of semi-through parts placed between the pair of blocking parts and adjust an intensity of an incident laser beam.

Each semi-through part may be extended from each blocking part.

The intensity of the laser beam may become weaker through a portion of a semi-through part that is closer to a blocking part.

The intensity of the laser beam may reduce stepwise in the semi-through part.

A metal plate may be provided in each blocking part.

A base substrate and a coating layer formed on the base substrate may be provided in each semi-through part.

The coating layer may comprise Cr, $MgF_2$, $Al_2O_3$, $SiO_2$, $CaF_2$, $AlF_3$, and/or MoSi.

The coating layer may comprise a slit.

The laser beam passing through the intensity pattern regulating unit may comprise a strip shape, and the intensity of the incident laser beam may be abruptly reduced at its opposite ends.

The laser apparatus may further comprise a projection lens adjusting a focus of the incident laser beam generated from the laser generating unit, wherein the intensity pattern regulating unit is placed behind the projection lens.

According to an embodiment of the present invention, a laser apparatus comprises a laser generating unit, and an intensity pattern regulating unit comprising a pair of blocking parts, a through part placed therebetween, and a semi-through part disposed between each blocking part and the through part.

According to an embodiment of the present invention, a method of manufacturing a thin film transistor comprises forming an amorphous silicon layer on a substrate, forming a polysilicon layer by crystallizing the amorphous silicon layer by using a laser apparatus comprising a laser generating unit and an intensity pattern regulating unit, wherein the intensity pattern regulating unit comprises a pair of blocking parts, a through part placed therebetween and a semi-through part disposed between each blocking part and the through part; forming a gate insulation film on the polysilicon layer, forming a gate electrode on the gate insulation film of the polysilicon layer, forming source and drain parts by injecting impurities in the polysilicon layer, forming an interlayer insulation film on the gate electrode, forming contact holes exposing the source and drain parts by etching the gate insulation film or the interlayer insulation film, and forming source and drain contact parts connected with the source and drain parts respectively through the contact holes.

BRIEF DESCRIPTION OF THE DRAWINGS

Preferred embodiments of the present disclosure can be understood in more detail from the following description taken in conjunction with the accompanying drawings in which.

DETAILED DESCRIPTION OF PREFERRED EMBODIMENTS

Figure 1:
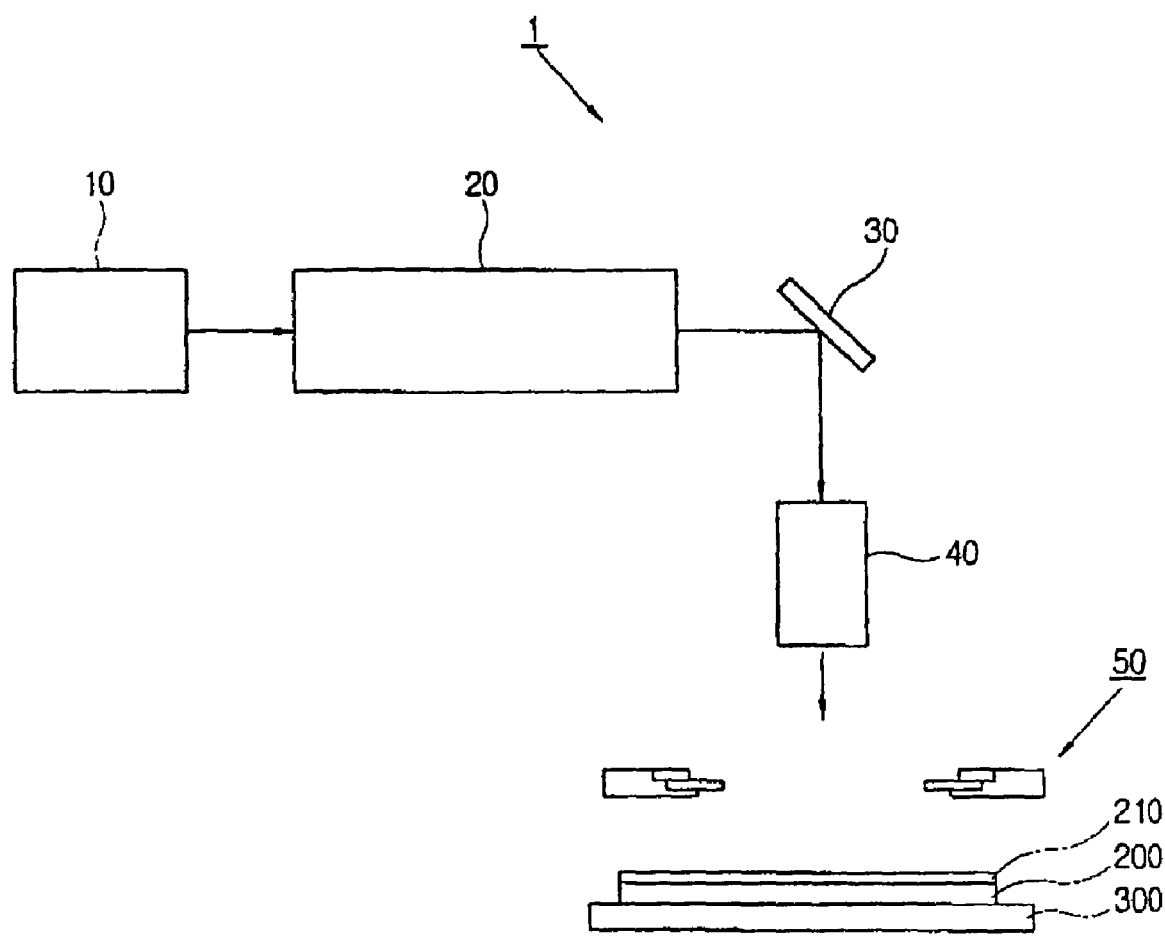
FIG. 1 is a schematic view showing a laser apparatus according to an embodiment of the present invention.

Preferred embodiments of the present invention will be described below in more detail with reference to the accompanying drawings. The present invention may, however, be embodied in many different forms and should not be construed as limited to the embodiments set forth herein. Referring to FIG. 1, the laser apparatus 1 comprises a laser generating unit 10, an optical system 20, a reflection mirror 30, a projection lens 40, and an intensity pattern regulating unit 50.

The laser generating unit 10 generates an unprocessed primitive laser beam. The laser generating unit 10 may comprise a laser generating tube (not shown). The laser generating tube comprises upper and lower electrodes, and therebetween are packed gases, such as, for example, Ze, Cl, He, or Ne. The size of the primitive laser beam is about 12 mm×about 36 mm.

The primitive laser beam generated in the laser generating unit 10 is supplied to the optical system 20. The optical system 20 comprises a plurality of mirrors and lenses. The optical system 20 adjusts the primitive laser beam as desired and provides the laser beam to the projection lens 40.

The laser beam adjusted through the optical system 20 is reflected at the reflection mirror 30, and then is irradiated to an amorphous silicon layer 210 via the projection lens 40. The projection lens 40 adjusts a focus of the laser beam. Although not shown, a protection lens may be provided at a lower part of the projection lens 40 to protect the projection lens 40 from being damaged during the crystallization process.

The laser beam irradiated by the projection lens 40 is in the form of a strip, and the size of the laser beam may be about 0.4 mm in width and about 200 mm in length. The intensity pattern regulating unit 50 regulates the length of the laser beam. The intensity of the laser beam is reduced gradually, in a continuous fashion, or abruptly, in one or more steps, at its opposite ends after the laser beam passes through the intensity pattern regulating unit 50.

Under the intensity pattern regulating unit 50 is placed a substrate 200 on which an amorphous silicon layer 210 is formed. The amorphous silicon layer 210 can be deposited on the substrate 200 by Plasma Enhanced Chemical Vapor-Deposition (PECVD) process. The substrate 200 is formed on a stage 300. The stage 300 moves the substrate 200 in X and Y direction to crystallize the entire portion of the amorphous silicon layer 210.

Figure 2:
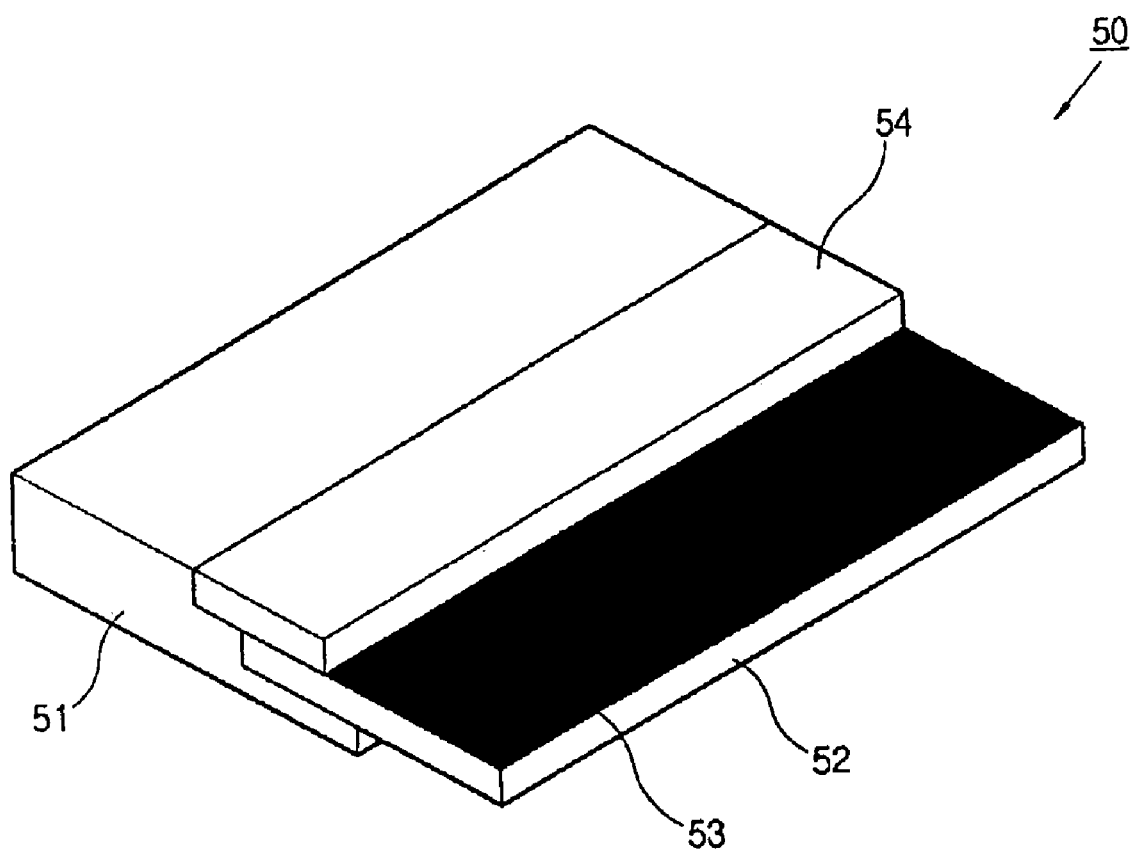
FIG. 2 is a perspective view of an intensity pattern regulating unit of a laser apparatus according to an embodiment of the present invention.
Figure 3:
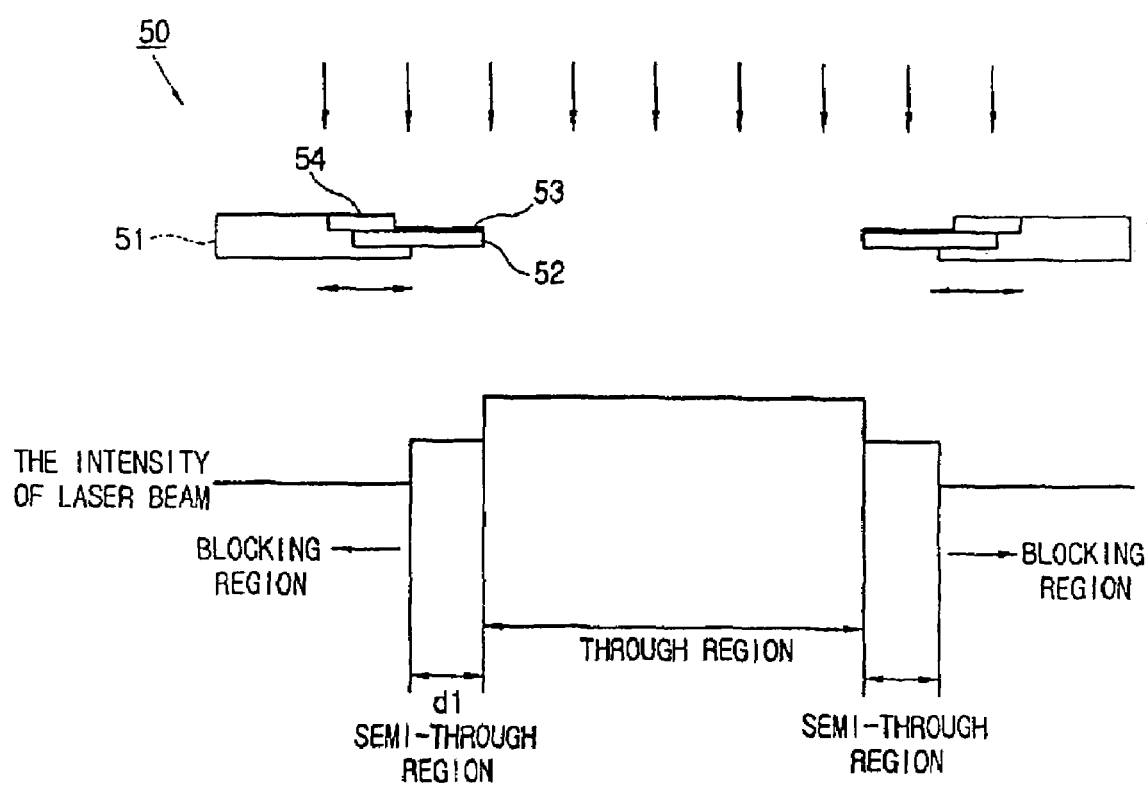
FIG. 3 is a schematic view describing an intensity pattern of a laser beam passing through a laser apparatus according to an embodiment of the present invention.

Referring to FIGS. 2 and 3, the intensity pattern regulating units 50 are disposed on opposite sides as pairs. A space between the intensity pattern regulating units 50 is a through region through which the laser beam passes maintaining its intensity. The distance between the intensity pattern regulating units 50 is equal to the length of the laser beam irradiated to the amorphous silicon layer 210. The intensity pattern regulating unit 50 comprises a metallic plate 51, a base substrate 52 combined with the metallic plate 51, and a combining element 54 combining the metallic plate 51 and the base substrate 52.

The metallic plates 51 are disposed on opposite sides as pairs. The metallic plate 51 may comprise, for example, aluminum or stainless steel. The laser beam cannot penetrate a blocking region where the metallic plate 51 is disposed.

The base substrate 52 is extended from the metallic plate 51 toward the through region, and the surface of the base substrate 52 is coated by a coating layer 53. The base substrate 52 may comprise quartz, and the coating layer 53 may comprise at least one of Cr, $MgF_2$, $Al_2O_3$, $SiO_2$, $CaF_2$, $AlF_3$, or MoSi. The laser beam passing through the coating layer 53 becomes weaker in intensity than the laser beam passing through the through region, thus the coating layer 53 extended from the metallic plate 51 toward the through region forms a semi-through region. The coating layer 53 reduces the intensity of the laser beam by reflecting or absorbing the laser beam. The intensity of the laser beam passing through the semi-through region may be about 50% of that of the laser beam passing through the through region.

The combining element 54 can be any object capable of fixing the metallic plate 51 to the base substrate 52. In an embodiment of the present invention, the combining element 54 may comprise a material that resists the laser beam.

The intensity pattern of the laser beam passing through the intensity pattern regulating unit 50 is described in FIG. 3. The laser beam maintains its intensity at the through region, but the laser beam cannot penetrate the blocking region. The laser beam immediately drops in intensity bypassing the semi-through region placed between the through region and the blocking region.

Figure 4:
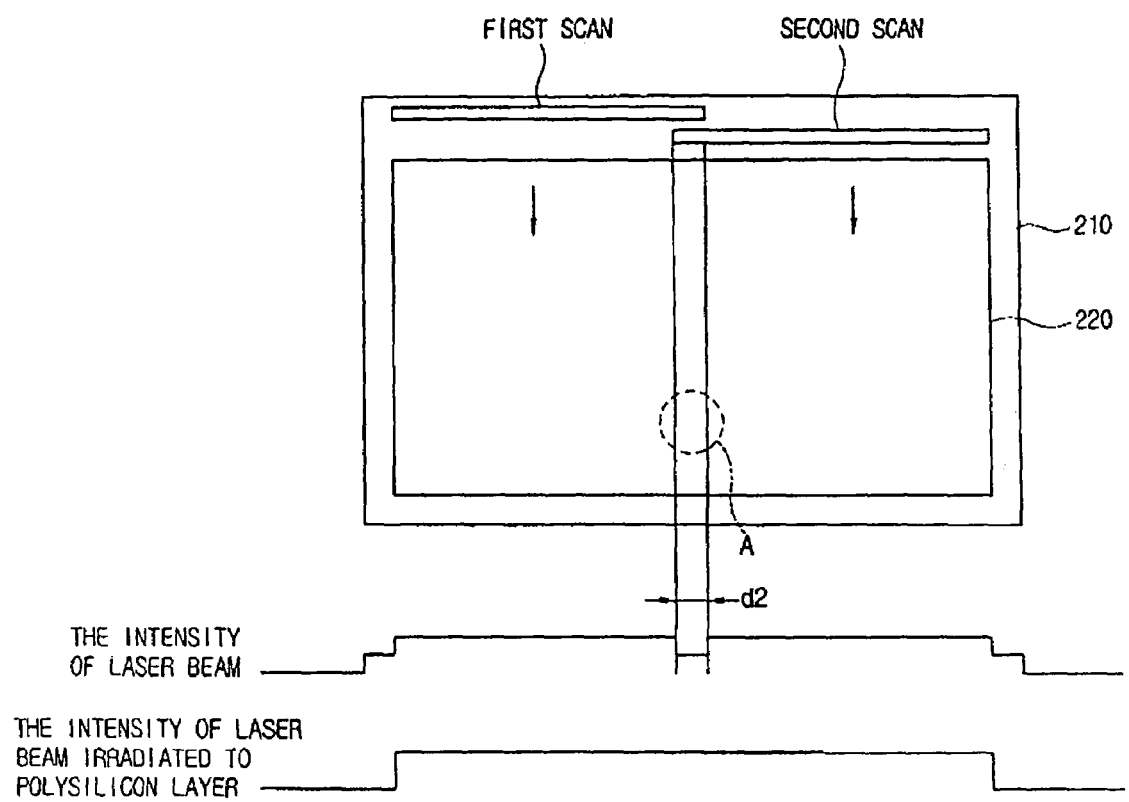
FIG. 4 is a schematic view showing a crystallization process of an amorphous silicon layer when using a laser apparatus according to an embodiment of the present invention.

FIG. 4 is a schematic view showing a crystallization process of an amorphous silicon layer using the laser apparatus according to an embodiment of the present invention.

While the substrate 200 is large in size, the length of the laser beam is limited. Therefore, the entire portion of the substrate 200 is scanned by scanning twice as shown in FIG. 4.

A partial area of the amorphous silicon layer 210 is crystallized by a first scan, and then the rest of the amorphous silicon layer 210 is crystallized by a second scan. The area A exposed to both the first and second scans is overly crystallized. A polysilicon layer 220 formed on the overly crystallized area may have different properties from the rest of the area.

The width of the overly crystallized area d2 may be approximately 0.1 mm to approximately 0.25 mm. The width of the semi-through region of the intensity pattern regulating unit 50 d1 may be substantially the same as that of the overly crystallized area d2. The overlapping portion of the polysilicon layer 220 crystallized by both the first and second scans, is crystallized by a weak laser beam passing through the semi-through region. The intensity of the laser beam passing through the semi-through region is about 50% of the intensity of the laser beam passing through the through region. Accordingly, the overly crystallized area is exposed to the same intensity laser beam as the rest of the area. Consequently, the entire substrate 200 is exposed to uniform intensity laser, thereby rendering the polysilicon layer 220 homogeneous.

Figure 5:
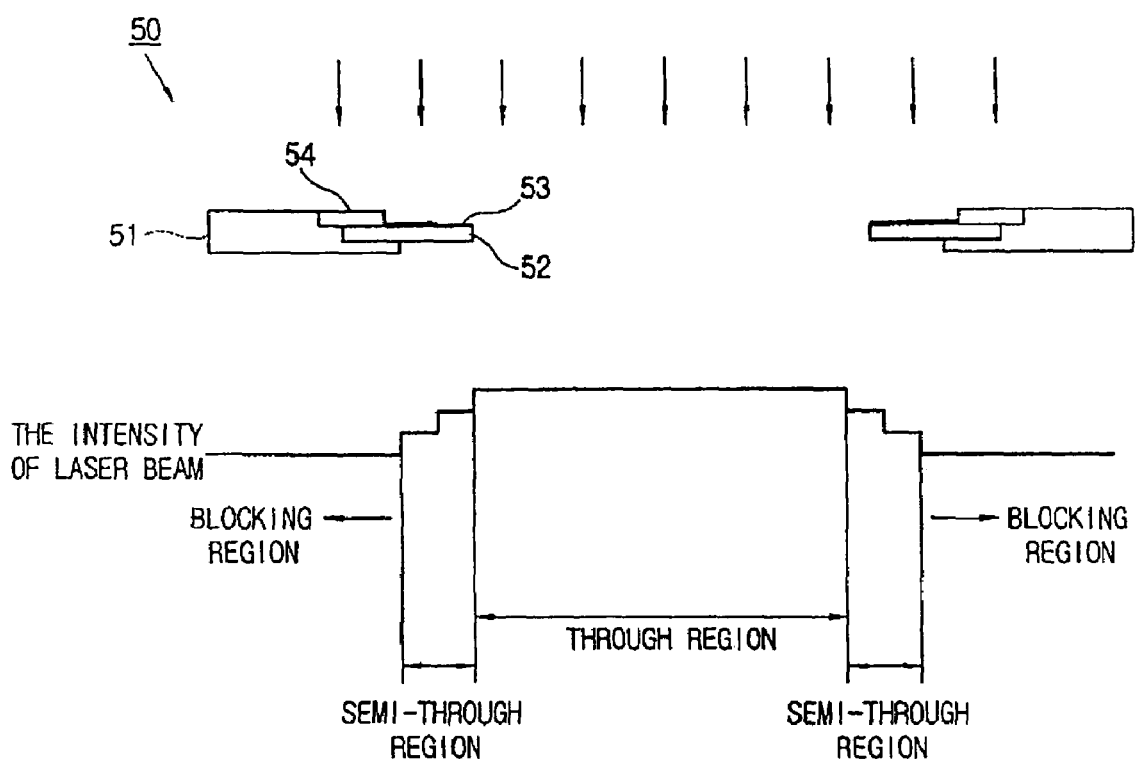
FIG. 5 is a schematic view describing an intensity pattern of a laser beam passing through a laser apparatus according to another embodiment of the present invention.

FIG. 5 is a schematic view describing an intensity pattern of a laser beam passing through a laser apparatus according to another embodiment of the present invention.

The coating layer 53 formed on the base substrate 52 has two portions each having a different blocking degree. The portion close to the through region has a lower blocking degree. The degree of intercepting the laser beam may vary depending on the thickness and material of the coating layer 53. Accordingly, the intensity at opposite ends of the laser beam passing through the intensity pattern regulating unit 50 varies stepwise and discontinuously.

Figure 6:
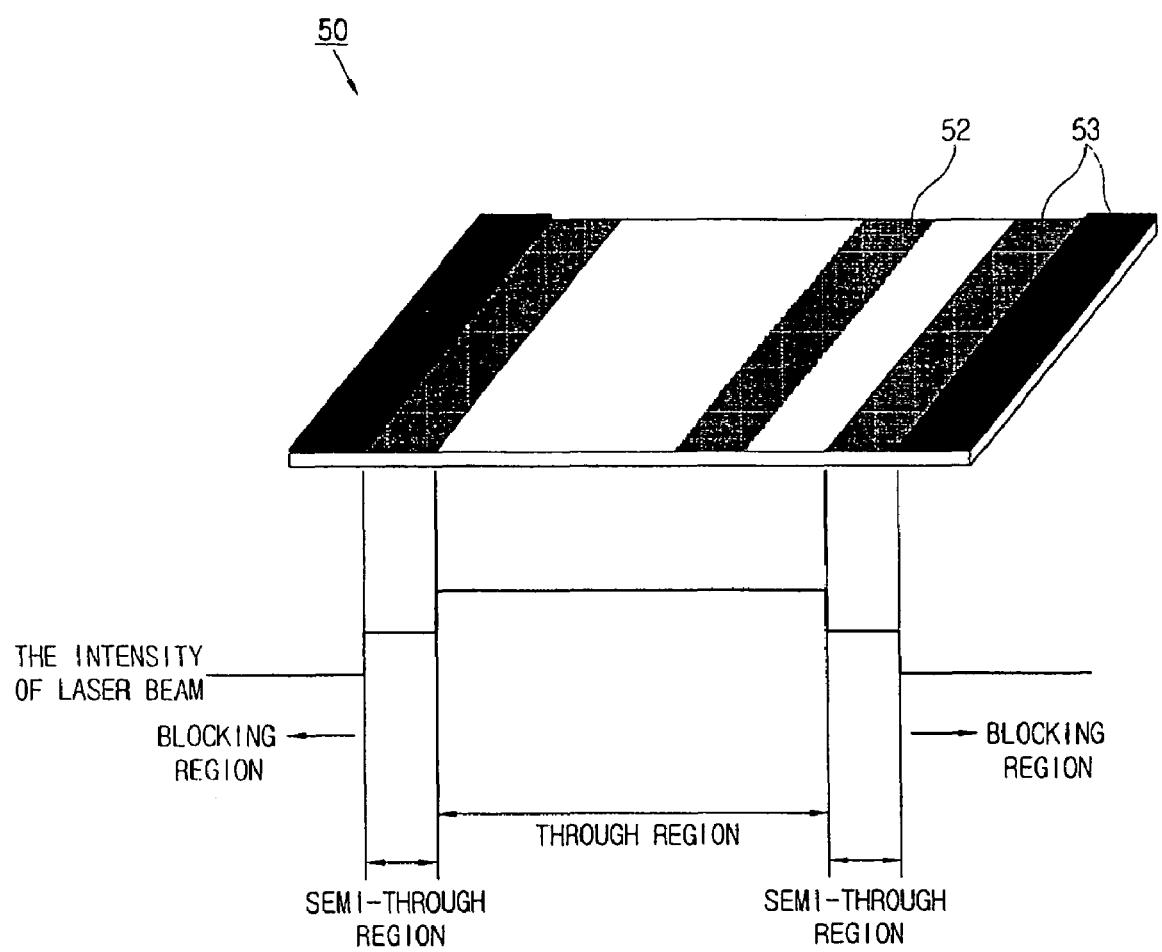
FIG. 6 is a perspective view of an intensity pattern regulating unit of a laser apparatus according to another embodiment of the present invention.
Figure 7:
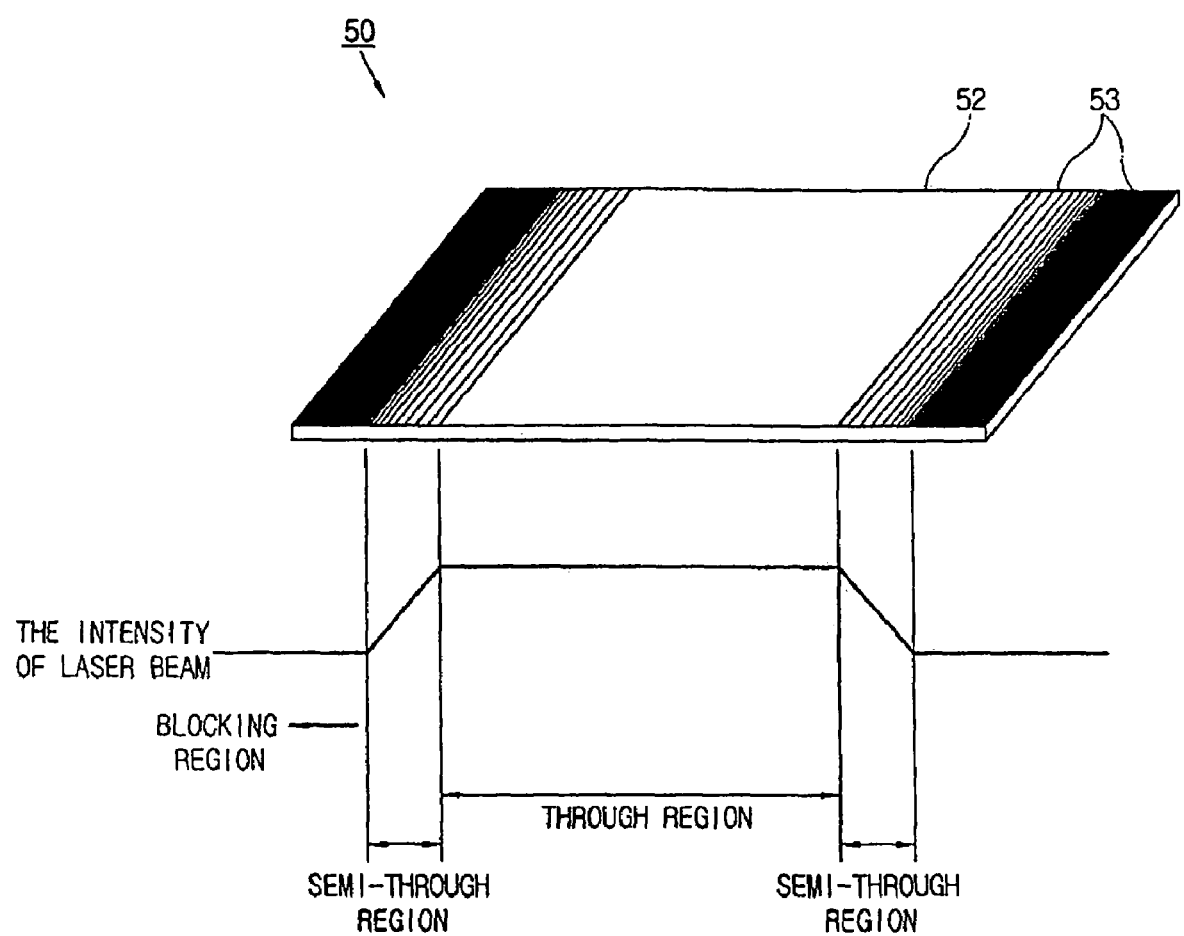
FIG. 7 is a perspective view of an intensity pattern regulating unit of a laser apparatus according to another embodiment of the present invention.

Referring to FIGS. 6 and 7, the intensity pattern regulating unit 50 according to embodiments of the present invention includes the base substrate 52 and the coating layer 53. The base substrate 52 may comprise quartz, and the coating layer 53 may comprise Cr, $MgF_2$, $Al_2O_3$, $SiO_2$, $CaF_2$, $AlF_3$, and/or MoSi. As shown in FIG. 6, the coating layer 53 in the intensity pattern regulating unit 50 according to an embodiment is formed thick in the blocking region, thin in the semi-through region, and not formed in the through region. The intensity pattern of the laser beam passing through the intensity pattern regulating unit 50 according to the embodiment shown in FIG. 6 is similar to the intensity pattern of the laser beam passing through the intensity regulating unit 50 according to the embodiment shown in FIG. 3.

As shown in FIG. 7, the coating layer 53 in the intensity pattern regulating unit 50 according to another embodiment is formed thick in the blocking region, and not formed in the through region. The coating layer 53 of the semi-through region is provided in a form of slits. As the slits get closer to the blocking region, a distance between slits becomes shorter. The laser beam becomes weaker when it passes through the slit. The narrower the space between the slits, the weaker the laser beam becomes. Therefore, the intensity of the laser beam passing through the intensity pattern regulating unit 50 reduces gradually and continuously at its opposite ends.

The laser apparatus 1 according to embodiments can also be applied to three or more scans. The semi-through region and the blocking region of the intensity pattern regulating unit 50 may be formed in a single body. Alternatively, the semi-through region and the blocking region may not be formed in a single body. The coating layer 53 of the semi-through area can vary in thickness, material, and shape.

Below will be described a polysilicon thin film transistor (TFT) manufactured using the laser apparatus 1 according to embodiments of the present invention.

Figure 8:
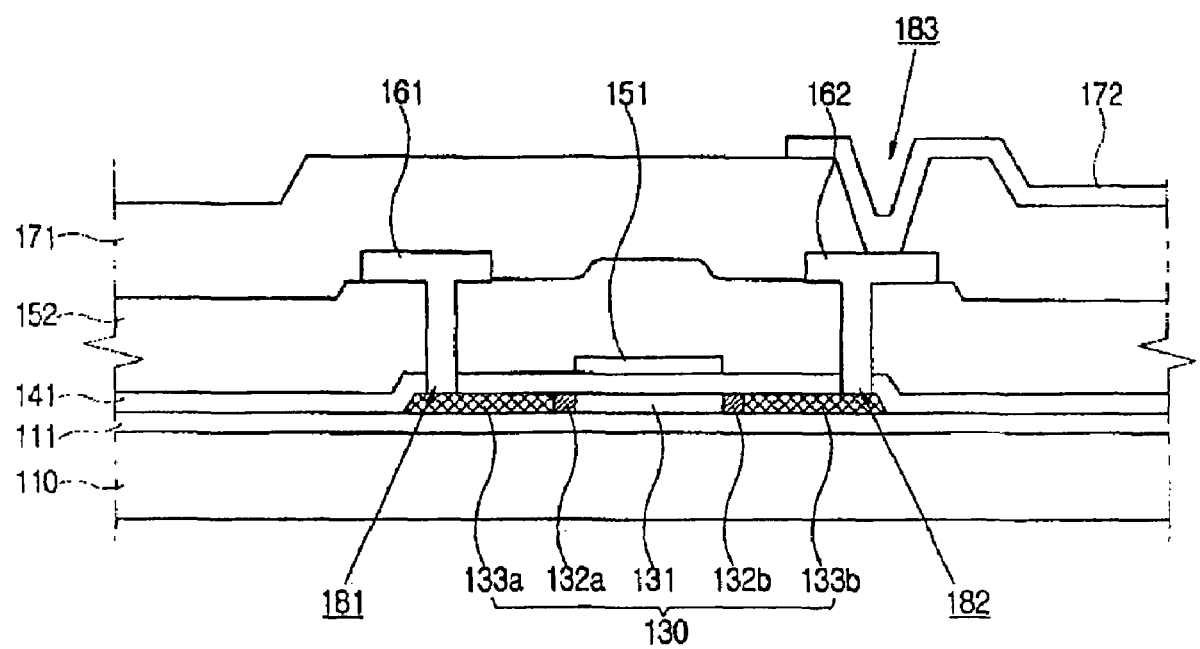
FIG. 8 is a cross-sectional view of a polysilicon thin film transistor according to an embodiment of the present invention.

As shown in FIG. 8, a buffer layer 111 is formed on a substrate 110, and a polysilicon layer 130 is formed on the buffer layer 111. The buffer layer 111 comprises, for example, silicon oxide, and prevents alkali metals of the substrate 110 from permeating to the polysilicon layer 130. The polysilicon layer 130 includes a channel part 131 disposed between lightly doped domain (LDD) layers 32a and 132b surrounded by source/drain parts 133a and 133b.

The LDD layers 132a and 132b are n− doped, and disperse hot carriers. The channel part 131 is not doped with impurities, and the source/drain parts 133a and 133b are n+ doped. On the poly silicon layer 130 is disposed a gate insulation film 141 comprising silicon oxide or silicon nitride, and on the gate insulation film 141 corresponding to the channel part 131 is disposed a gate electrode 151. On the gate insulation film 141 is disposed an interlayer insulation film 152 covering the gate electrode 151.

The gate insulation film 141 and the interlayer insulation film 152 have contact holes 181 and 182 exposing the source/drain parts 133a and a33b of the polysilicon layer 130. On the interlayer insulation film 152 are disposed a source contact part 161 connected with the source part 133a through the contact hole 181 and a drain contact part 162 positioned opposite to the source contact part 161 with respect to the gate electrode 151 therebetween. The drain contact part 162 is connected with the drain part 133b through the contact hole 182. The interlayer insulation film 152 is covered with a passivation film 171, and in the passivation film 171 is disposed a contact hole 183 exposing the drain contact part 162. On the passivation film 171 is disposed a pixel electrode 172 comprising ITO (Indium Tin Oxide), IZO (Indium Zinc Oxide), or a conducting material having reflectivity. The pixel electrode 172 is connected with the drain contact part 162 through the contact hole 183.

Below will be described a process of fabricating the polysilicon TFT according to embodiments of the present invention.

Figure 9A:
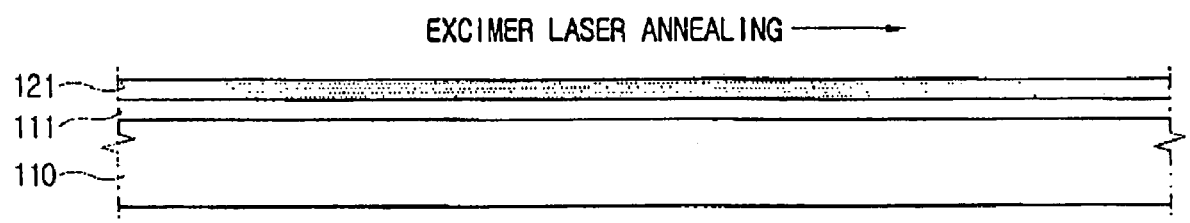
FIGS. 9A to 9E are cross-sectional views showing a manufacturing process of a polysilicon thin film transistor according to an embodiment of the present invention.

As shown FIG. 9A, the buffer layer 111 and the amorphous silicon layer 121 are deposited over the substrate 110. Then the amorphous silicon layer 121 is crystallized by the excimer laser annealing process using the laser apparatus 1 comprising the intensity pattern regulating unit 50 according to embodiments of the present invention. With the intensity pattern regulating unit 50 according to embodiments of the present invention, the intensity of the laser beam irradiated to the amorphous silicon layer 121 can be uniform.

Figure 9B:
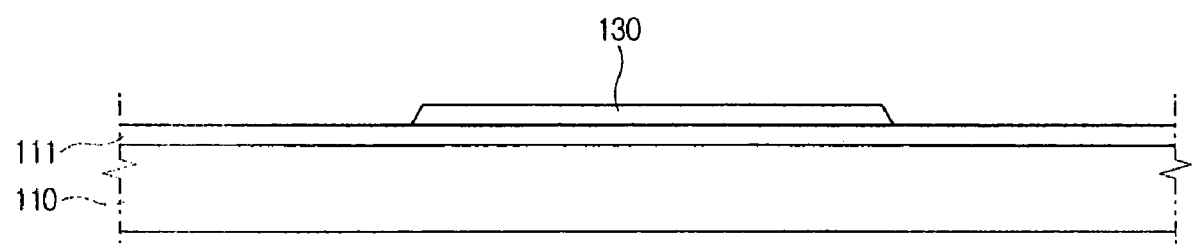

FIG. 9B shows a patterning of a crystallized polysilicon layer 130.

Figure 9C:
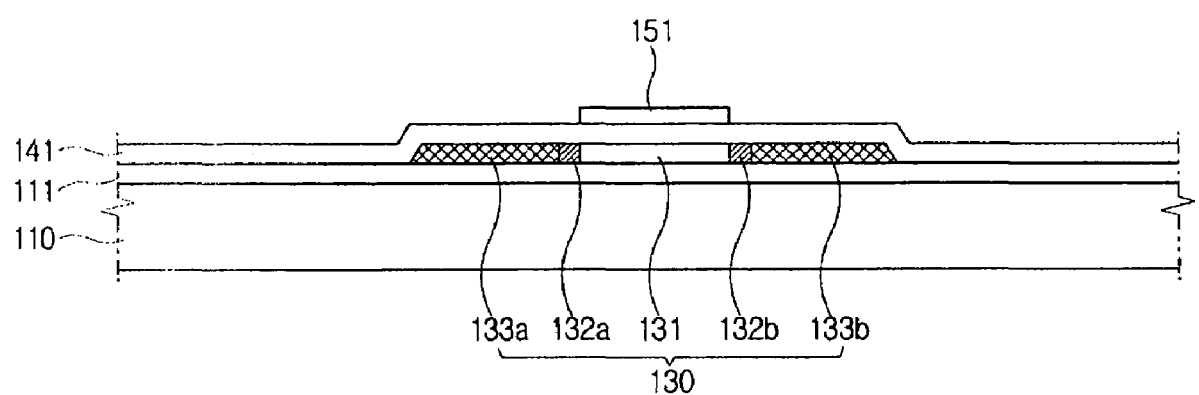
Figure 9D:
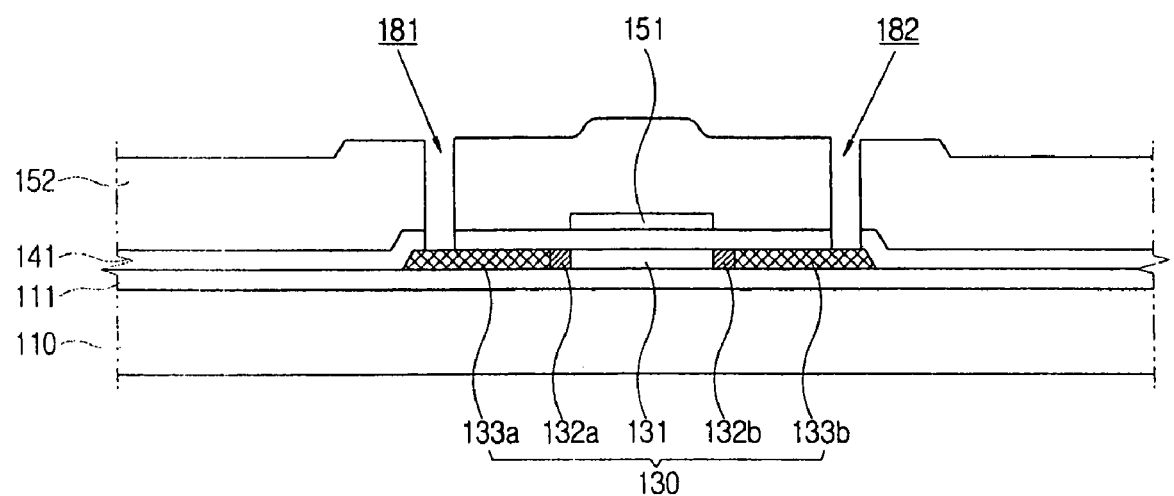
Figure 9E:
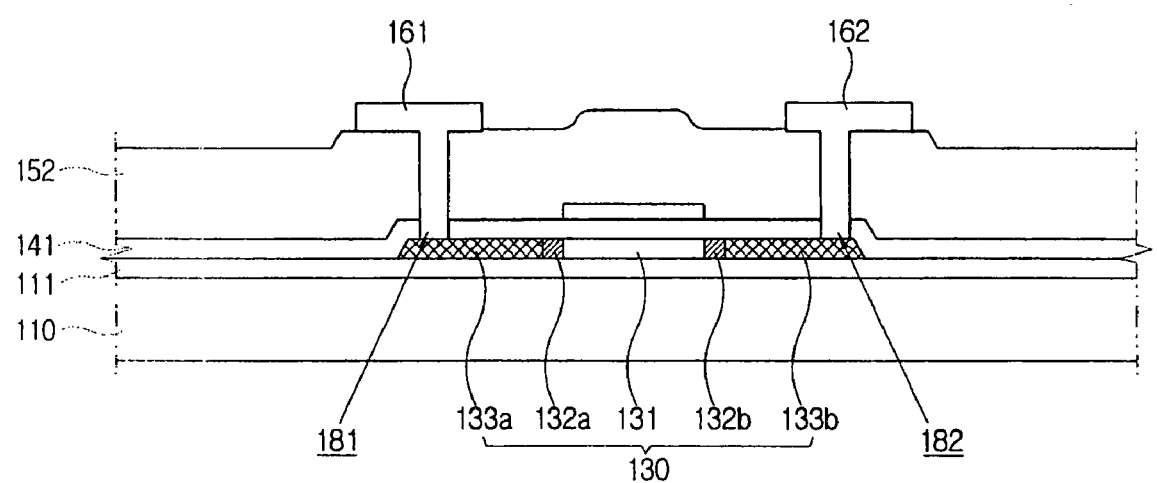

Subsequently, as shown in FIG. 9C, the gate insulation film 141 is formed by depositing silicon oxide or silicon nitride. Then, a conductive material for a gate wire is deposited and patterned to form the gate electrode 151. Then, by applying the gate electrode 151 as a mask, n type impurities are injected so that the channel part 131, the LDD layer 132a and 132b, the source/drain part 133a and 133b are formed in the polysilicon layer 130. There are variable ways to fabricate the LDD layer 132a and 132b. For example, the gate electrode 151 is formed of a double layer and followed by an etching process to form an overhang. Next, as shown in FIG. 9D, the interlayer insulation film 152 covering the gate electrode 151 is formed on the gate insulation film 141, and patterned with the gate insulation film 141, thereby forming the contact holes 181 and 182 exposing the source/drain part 133a and 133b of the polysilicon layer 130.

Then, as shown in 9E, metals for data wire are deposited on an upper part of the substrate 110 and patterned to form the source contact part 161 and the drain contact part 162 connected with the source/drain part 133a and 133b respectively, through the contact holes 181 and 182.

Afterwards, as shown in FIG. 8, the passivation film 171 is deposited over the source contact part 161 and the drain contact part 162 and patterned to form the contact hole 183 exposing the drain contact part 162. Transparent conductive materials such as ITO, IZO or conductive materials having high reflectivity are disposed and patterned to form the pixel electrode 172.

The TFT and the TFT substrate according to embodiments of the present invention can be employed in not only an LCD device but also in an organic light emitting diode (OLED) device.

The OLED uses an organic material that emits light by itself when receiving an electric signal. Such an OLED having a layered structure comprises a cathode layer (pixel electrode), hole injecting layer, a hole transporting layer, a light-emitting layer, an electron transportation layer, an electron implantation layer, and an anode layer(counter electrode).

According to embodiments of the present invention, the drain contact part of the TFT substrate is electrically connected with the cathode layer, thereby transmitting data signal. The drain contact part of the TFT substrate can be electrically connected with the anode layer.

Although preferred embodiments have been described with reference to the accompanying drawings, it is to be understood that the present invention is not limited to these precise embodiments but various changes and modifications can be made by one skilled in the art without departing from the spirit and scope of the present invention. All such changes and modifications are intended to be included within the scope of the invention as defined by the appended claims.

What is claimed is:

1. A laser apparatus comprising:
a laser generating unit; and
an intensity pattern regulating unit including a pair of blocking parts and a pair of semi-through parts,
wherein the pair of semi-through parts are placed between the pair of blocking parts and reduce an intensity of an incident laser beam passing through the pair of semi-through parts,
wherein a metal plate is provided in each blocking part, and a base substrate and a coating layer formed on the base substrate are provided in each semi-through part.

2. The laser apparatus of claim 1, wherein each semi-through part is extended from each blocking part.

3. The laser apparatus of claim 1, wherein the intensity of the laser beam becomes weaker through a portion of a semi-through part that is closer to a blocking part.

4. The laser apparatus of claim 3, wherein the intensity of the laser beam reduces stepwise in the semi-through part.

5. The laser apparatus of claim 1, wherein the pair of blocking parts are disposed parallel with each other.

6. The laser apparatus of claim 1, wherein the coating layer comprises at least one of Cr, $MgF_2$, $Al_2O_3$, $SiO_2$, $CaF_2$, $AlF_3$, or MoSi.

7. The laser apparatus of claim 1, wherein the coating layer comprises a slit.

8. The laser apparatus of claim 1, wherein the incident laser beam passing through the intensity pattern regulating unit comprises a strip shape, and the intensity of the incident laser beam is abruptly reduced at its opposite ends.

9. The laser apparatus of claim 1, further comprising a projection lens adjusting a focus of the incident laser beam generated from the laser generating unit, wherein the intensity pattern regulating unit is placed behind the projection lens.

10. A laser apparatus comprising:
a laser generating unit; and
an intensity pattern regulating unit comprising a pair of blocking parts, a through part placed between the pair of blocking parts and a semi-through part disposed between each blocking part and the through part,
wherein:
an intensity of a laser beam passing through the through part maintained,
an intensity of a laser beam passing through the semi-through part is reduced, and
a metal plate is provided in each blocking part, and a base substrate and a coating layer formed on the base substrate are provided in each semi-through part.

11. The laser apparatus of claim 10, wherein the through part comprises a strip shape.

* * * * *